United States Patent
Yun

[11] Patent Number: 6,069,760
[45] Date of Patent: May 30, 2000

[54] METHOD OF ELIMINATING WIGGLE NOISE FOR A DISK DRIVING/RECORDING APPARATUS

[75] Inventor: Jong-Yun Yun, Suwon, Rep. of Korea

[73] Assignee: SamSung Electronics Co., Ltd., Suwon, Rep. of Korea

[21] Appl. No.: 08/937,457

[22] Filed: Sep. 25, 1997

[30] Foreign Application Priority Data

Sep. 25, 1996 [KR] Rep. of Korea ............. 96-42646

[51] Int. Cl.[7] .................. G11B 5/03; G11B 5/596
[52] U.S. Cl. ......................... 360/53; 360/77.08
[58] Field of Search .................. 360/53, 77.08, 360/51

[56] References Cited

U.S. PATENT DOCUMENTS

| | | | |
|---|---|---|---|
| 5,053,892 | 10/1991 | Supino, Jr. et al. | 360/62 |
| 5,187,860 | 2/1993 | Horibata et al. | 360/125 |
| 5,276,564 | 1/1994 | Hessing et al. | 360/51 |
| 5,392,169 | 2/1995 | Argyle et al. | 360/45 |
| 5,623,378 | 4/1997 | Shibasaki et al. | 360/67 |
| 5,682,272 | 10/1997 | Taroda et al. | 360/53 |

*Primary Examiner*—Nabil Hindi
*Assistant Examiner*—Regina Y. Neal
*Attorney, Agent, or Firm*—Robert E. Bushnell, Esq.

[57] ABSTRACT

A method of eliminating a wiggle noise generated by a data write current applied to a thin-film head during a data write operation in a disk drive storage apparatus having a storage medium on which data is recorded, the method comprising the step of: on occurrence of any read error owing to the wiggle noise, causing the head to perform a dummy write operation onto a given one of one or more intersector gap intervals in a corresponding track on the storage medium; and retrying a data read operation, subsequent to searching a target sector, the data read operation being repeated by predetermined retry times if the read error is continuously detected on the data read operation.

12 Claims, 4 Drawing Sheets

6,069,760

METHOD OF ELIMINATING WIGGLE NOISE FOR A DISK DRIVING/RECORDING APPARATUS

CLAIM OF PRIORITY

This application makes reference to, incorporates the same herein, and claims all benefits accruing under 35 U.S.C. §119 from an application entitled Method Of Eliminating Wiggle Noise For Disk Driving/Recording Apparatus earlier filed in the Korean Industrial Property Office on Sep. 25, 1996, and there duly assigned Ser. No. 96-42646 by that Office.

BACKGROUND OF THE INVENTION

1. Field of the Invention

The present invention relates to a disk driving/recording apparatus having a thin-film head, and more particularly to a method of eliminating a wiggle noise generated by data recording current applied to the thin-film head during the recording operation of data on a magnetic recording medium.

2. Description of the Related Art

Currently, a disk driving/recording apparatus such as a hard disk drive (hereinbelow, referred to as HDD) and a floppy disk drive is widely used as an auxiliary memory device in a computer system. Particularly, among them the HDD has merit in that it can stably store a large quantity of data as well as access the large quantity of data at a high speed. These days, for the HDD, for the purpose of maximization of data storage capacity a track density of a disk or a magnetic recording medium has been continuously increased, which is followed by a trend toward more high head precision. A head used the most widely as high precise head now is a thin-film head on which a core is formed by using a semiconductor technique. The use of the thin-film head may increase data record density, but raise new various problems relating to the property of a head pole. An example of such a manufacturing process is described in U.S. Pat. No. 5,187,860 to Shinji Horibata, et al. entitled Method Of Manufacturing Thin Film Magnetic Head.

A typical one of the above problems is a phenomenon which is called a wiggle noise. This represents a noise generated when the operation mode of the HDD is changed from a record state to a read state.

Now, an explanation on the wiggle noise generation process will be given. When data is recorded a data recording current is applied to a coil of the head and the magnetic polarity of the poles in the head causes a magnetic field to be generated in the gap between the head and the surface of a disk. The magnetization of a magnetic layer of the disk by the generated magnetic field allows data to be recorded on the surface of the disk. Such a data recording operation is accomplished by interrupting the data recording current after all data to be recorded is recorded. Once the data recording current is interrupted, from that moment the arrangement of materials constituting the poles is disorderly, unlike when data are being read as an entropy increases, which causes a variation in the magnetic field. Such a variation in the magnetic field affects the coil of the magnetic head, causing a current component to be produced in the coil, and such a current component is called a an irregular noise due to wiggle phenomenon, also known as a wiggle noise due to a domain pinning phenomenon.

The aforementioned domain pinning phenomenon represents a metastable state of the magnetic head due to unbalance of magnetization, and in this state there has been a problem that the stable data playback operation is not executed since the magnetic head is in an unstable state. U.S. Pat. No. 5,053,892 to Louis Supino, Jr., et al., entitled Thin Film Head Read Recover attempts to solve this conventional problem by repositioning the head over a diagnostic read/write track having no data which is located inside a guard band, when data read error is generated by the domain pinning phenomenon. Then the magnetic head executes a write operation on the diagnostic track. Then the head is repositioned back over the original track from which a data read error was generated to attempt to read data again. The write operation is performed in order to reconfigure the domains and thus return the head to a condition in which it can perform an acceptable read operation. In this case, a latency time for the magnetic head to be repositioned over the diagnostic track and then back over the original track is required, thereby deteriorating the performance of the HDD.

U.S. Pat. No. 5,392,169 to Bernell E. Argyle, et al., entitled Electrical Means To Diminish Read-Back Signal Waveform Distortion In Recording Heads contemplates a method and apparatus for eliminating unfavorable magnetic domain patterns in the head by storing a polarity of the last write current pulse of a write pulse train applied to the head coils, and resetting the head to a magnetic domain state most preferred for a read operation by applying a reset pulse, or pulses, to the head prior to the read operation when the stored polarity of the last write current pulse is determined to be opposite the polarity of a reset current pulse. The reset pulse(s) are applied to the head after the head is either re-positioned over a dedicated track having no data, or, if not re-positioned, only when the head is flying over a sector gap.

A more recent effort to avoid the problems which occur due to the use of thin film magnetic heads and increase disk density has been an effort to replace the thin film magnetic heads with a head using an element utilizing magneto-resistive effect, i.e., a MR head. The use of MR heads also, however, also results in problems occurring due to transitions between read and write states as in a shown by Hidekazu Shibasaki, et al. in U.S. Pat. No. 5,623,378 entitled Signal Reproducing Circuit Adopted For Head Utilizing Magneto-Resistive Effect With Control For Reducing Transient Period Between Read And Write States.

SUMMARY OF THE INVENTION

It is therefore an object of the present invention to provide a method for eliminating a wiggle low noise generated due to a domain pinning phenomenon without seeking any auxiliary track and including a separate area in a disk driving/recording apparatus having a thin-film head.

This object of the present invention have been attained by providing a method of eliminating a wiggle noise generated by a data write current applied to a thin-film head during a data write operation in a disk drive storage apparatus having a storage medium on which data is recorded, the method comprising the step of: on occurrence of any read error owing to the wiggle noise, causing said head to perform a dummy write operation onto a given one of one or more intersector gap intervals in a corresponding track on the storage medium; and retrying a data read operation, subsequent to searching a target sector, the data read operation being repeated by predetermined retry times if the read error is continuously detected on the data read operation.

BRIEF DESCRIPTION OF THE DRAWING

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1A:
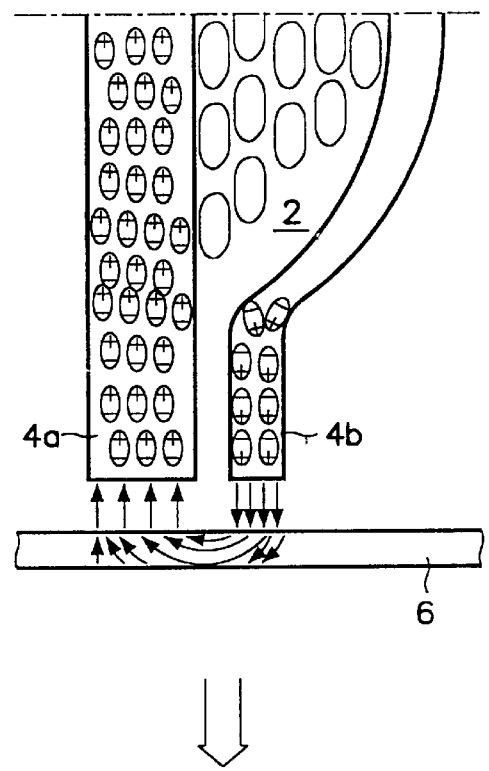
FIGS. 1A and 1B are a partially sectional view illustrating a head core showing a variation in the arrangement state of a magnetic polarity of a pole before and after interrupting data recording current.

Now, an explanation on the wiggle noise generation process will be in detail given hereinafter with reference to FIGS. 1A and 1B. FIg. 1A is a partially sectional view of a head core showing the arrangement state of a magnetic polarity of a pole when data recording current is applied to a-thin-film head, and FIG. 1B is a partially sectional view of a head core showing the arrangement state of a magnetic polarity of a pole after interrupting data recording current being applied to the thin-film head.

Figure 1B:
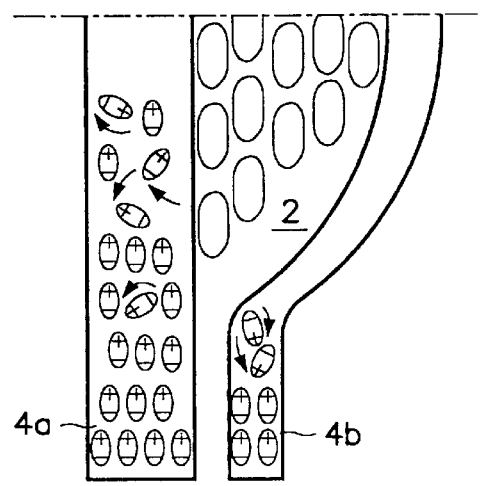

Referring to FIGS. 1A and 1B of the drawings, reference numeral 2 indicates a coil of a magnetic head, reference numerals 4a and 4b indicate magnetic poles, and reference numeral 6 indicates a magnetic layer of a disk.

First, when data are being recorded, a data recording current is applied to a coil 2 of the head and a magnetic polarity of poles 4a and 4b is arranged in a regular direction as shown in FIG. 1A, which causes a magnetic field to be generated in a space between an end of the head and the upper surface of disk 6, and the magnetization of a magnetic layer of disk 6 by the generated magnetic field allows data to be recorded on the surface of disk 6. Such a data recording operation is accomplished by interrupting the data recording current after all data to be recorded are recorded. Once the data recording current is interrupted, from that moment the arrangement of materials constituting poles 4a and 4b are disorderly as shown in FIG. 1B unlike when data are being read as an entropy increases, which causes a variation in the magnetic field. Such a variation in the magnetic field affects coil 2 of the magnetic head, causing any current to be produced in coil 2 and such a current component is called a wiggle noise due to a domain pinning phenomenon.

Figure 2:
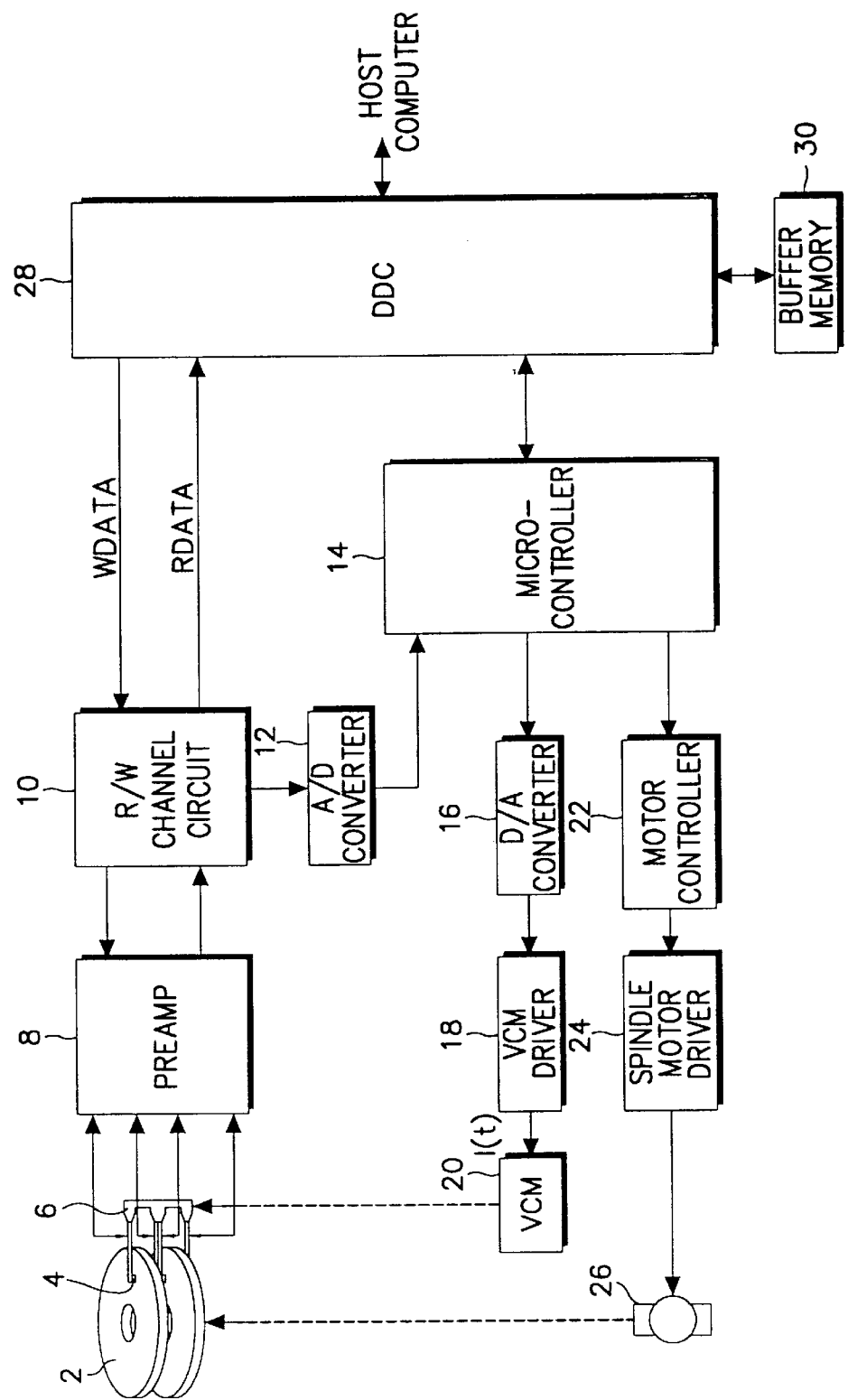
FIG. 2 is a block diagram illustrating the inner construction of a hard disk drive.

FIG. 2 is a block diagram illustrating the inner construction of a hard disk drive including two magnetic disks 2 and four magnetic heads 4 corresponding thereto. Referring to FIG. 2, disks 2, which normally assumes the form of a stack, are rotatably mounted on a driving shaft of a spindle motor 26, and there is typically a single magnetic head 4 for each disk surface. Each magnetic head 4 is positioned over a surface of a corresponding magnetic disk 2 and installed at one end of an extended actuator arm 6 of an actuator arm assembly having a rotary voice coil motor (hereinbelow, referred to as VCM) 20. During the read operation of data, a pre-amplifier 8 which is coupled to a read/write (hereinbelow, referred to as R/W) channel circuit 1 0-pre-amplifies a read signal picked up by one of the magnetic heads 4 to provide it to R/W channel circuit 10, and during the write operation of data, enables encoded write data applied from the R/W channel circuit 10 to be written on the surface of one of the magnetic disks 2 through the driving of corresponding one of the magnetic heads 4. At this time, pre-amplifier 8 selects one of the magnetic heads 4 under the control of a disk data controller 28 (hereinbelow, referred to as DDC).

The R/W channel circuit 10 which is coupled to the pre-amplifier 8, an analog-to-digital converter (hereinbelow, referred to as A/D converter) 12 and a disk data controller (hereinbelow, referred to as DDC) 28 decodes the read signal applied from the pre-amplifier 8 and generates read data RDATA to provide it to the DDC 28, and encodes write data WDATA applied from the DDC 28 to provide the encoded data to the pre-amplifier 8. Further, the R/W channel circuit 10 demodulates head position information which is a part of servo information written on the disk 2 to generate a position error signal (hereinbelow, referred to as PES). The PES generated from the R/W channel circuit 10 is provided to the A/D converter 12, which in turn converts the PES applied thereto into a digital value corresponding to its level to provide the converted signal value to a microcontroller 14. The DDC 28 transmits the data received from a host computer through the RX channel circuit 10 and the pre-amplifier 8 to the surface of the magnetic disk 2, or transmits the data read from the magnetic disk 2 to the host computer, in response to data read/write command received from the host computer. Additionally, the DDC 28 interfaces the communications between the host computer and microcontroller 14 as well as interfaces the servo control of microcontroller 14 in response to data read/write command received from the host computer.

Meanwhile, microcontroller 14 which is coupled to the DDC 28 controls the DDC 28 in response to data read/write command received from the host computer, and controls track seek and track following operations. At this moment, microcontroller 14 controls the aforementioned track following operation by using the PES value applied from the A/D converter 12, and executes the servo control operation in correspondence with various signals relating to servo control outputted from a gate array (not shown).

A digital-to-analog converter (hereinbelow, referred to as D/A converter) 16 receives a digital control output signal for controlling the position of the magnetic heads 4 generated from microcontroller 14, converts the received signal into analog data, and finally outputs the converted data to the VCM driver 18. The VCM driver 18 is coupled to the VCM 20 and the D/A converter 16, and controls the driving of the VCM 20 under the control of microcontroller 14 as well as generates current I(t) for driving the actuator arm by the signal applied from the D/A converter 16 to provide it to the VCM 20. Disposed on one end of the actuator arm is the VCM 20 and the magnetic heads 4 are attached at the other end thereof. Also, the VCM 20 moves the magnetic head 4 horizontally over the track on the magnetic disk 2 in correspondence with the direction and the level of the driving current applied from the VCM driver 18. A motor controller 22 controls the spindle motor driver 24 according to a control value for the rotation control of the magnetic head 2 generated from microcontroller 14. The spindle motor driver 24 controls the driving of the spindle motor 26 under the control of the motor controller 22, and the spindle motor 26 enables the magnetic disk 2 to be rotated under the control of the spindle motor driver 24. A buffer memory which is coupled to the DDC 28 stores temporarily the data transmitted between the magnetic disk 2 and the host computer.

Figure 3:
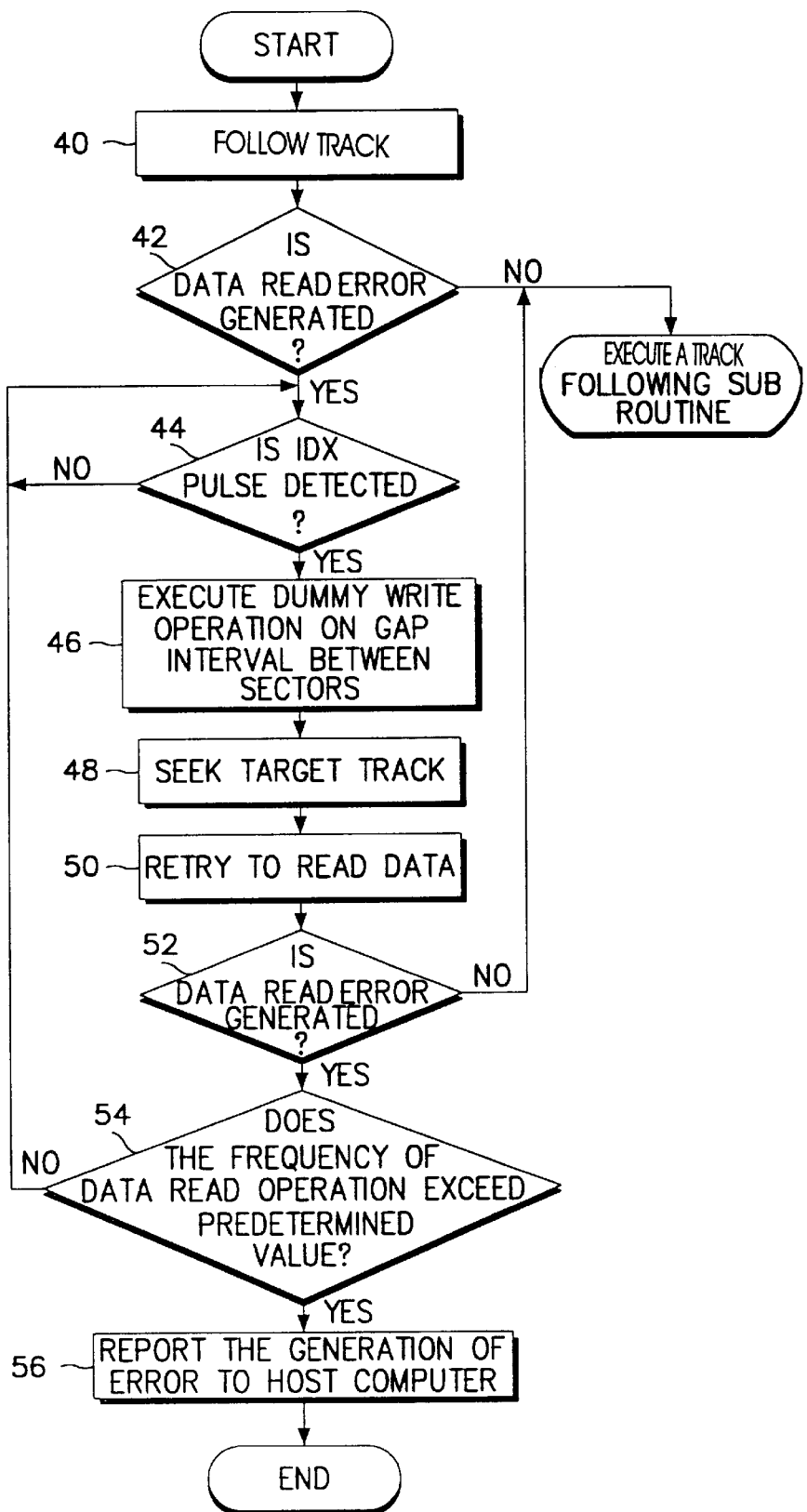
FIG. 3 is a flowchart illustrating a process routine for eliminating a wiggle noise according to an embodiment of the present invention.
Figure 4:
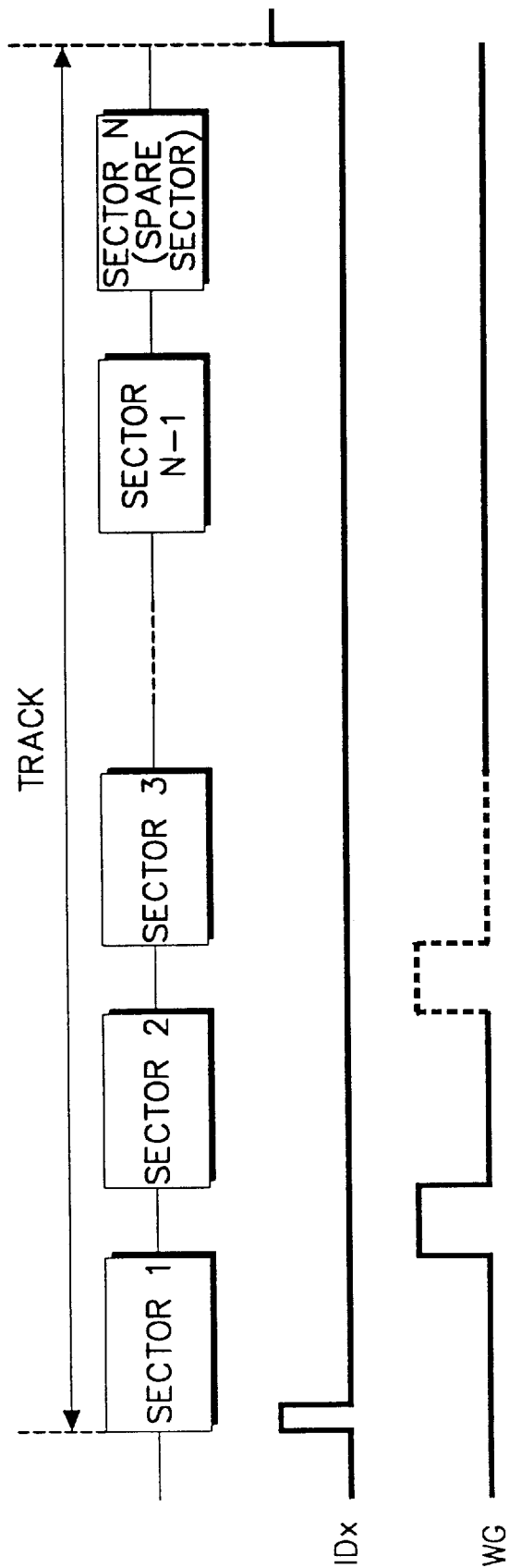
FIG. 4 illustrates a timing diagram of an index pulse and a write gate pulse according to an embodiment of the present invention.

FIG. 3 is a flowchart illustrating a process routine for eliminating a wiggle noise according to an embodiment of the present invention, and FIG. 4 illustrates a timing diagram of an index (hereinbelow, referred to as IDX) pulse and a write gate (hereinbelow, referred to as WG) pulse according to an embodiment of the present invention.

In general, tracks concentrically arranged on a disk are respectively divided into servo sectors and data sectors. The servo sectors are regions having various servo information, such as index, head number, cylinder number, etc., recorded thereon. All of the servo sectors include index regions having index bits. A primary index is called a main index and other indexes on the same track are called sub indexes. The index bits provide servo information during each rotation of the disk. Referring to the index pulse IDX, read/write channel circuit 10 of FIG. 2 demodulates a signal read from the disk and outputs servo serial data to a programmable servo timing generator (not shown) having an index pulse generator for generating an index pulse according to a program from microcontroller 14. An example of a known circuit for generating an index pulse is provided in U.S. Pat. No. 5,276,564 to Charles E. Hessing, et al. entitled Programmable Start-Of-Sector Pulse Generator For A Disk Drive Using Embedded Servo Bursts And Split Data Fields, incorporated by reference herein.

Now, an explanation on the elimination process of a wiggle noise according to an embodiment of the present invention will be in detail given hereinafter with reference to FIGS. 2 to 4. First, when receiving a data write command from the host computer, microcontroller 14 converts a operation mode of the HDD into a write mode in response to the reception of the data write command, and then moves the magnetic head 4 to a target track. After that, when the magnetic head 4 reaches the target track, at step 40, microcontroller 14 controls on-track operation of the magnetic head 4 through a track following operation. And then, microcontroller 14 enables the data transmitted from the host computer to be written on a predetermined sector of the target track. When a situation occurs where it becomes necessary to read servo information (or data ID information) positioned between data areas, because a servo area on which servo information for controlling the position of the magnetic head 4 is written and a data area on which user data are written are alternately disposed on a typical sector. Therefore, when the track following operation is accomplished at step 40, microcontroller 14 senses at step 42 if a data (servo information or data ID information) read error is generated due to wiggle noise by domain pinning phenomenon. If it is determined that a data read error is generated in step 42, the program proceeds to step 44 at which microcontroller 14 determines whether or not an IDX pulse is detected. If the IDX pulse is detected, the program advances to step 46 at which microcontroller 14 allows the magnetic head 4 to execute a dummy write operation on a gap interval between sectors. The gap interval between sectors means the interval (may vary according to a manufacturing company) positioned between one sector and the other sector. It is assumed that such interval represent the interval between sector 1 and sector 2 as shown in FIG. 4 in an embodiment of the present invention. Namely, at step 46, microcontroller 14 enables a WG pulse in a "high" state as shown in FIG. 4 so as to convert the unstable arrangement state of a magnetic polarity of the magnetic head 4 into stable arrangement state, thereby eliminating a wiggle noise. Meanwhile, the time when such a WG pulse is enabled can be simply embodied by generating it after the lapse of time of 1 sector quantity in synchronization with the time when the IDX pulse is detected.

After the dummy write operation is executed at step 46, the program proceeds to step 48 where microcontroller 14 seeks the target sector positioned on a corresponding track, and at subsequent step 50, allows the magnetic head 4 to retry read data. During the retrial of data read operation, microcontroller 14 senses at step 52 if data read error is again generated. If it is determined by the microcontroller 14 that the data read error is not generated again, microcontroller 14 executes a track following sub-routine. If, on the other hand, it is determined at step 52 that the data read error is generated, the program proceeds to step 54 where it is determined by microcontroller 14 whether or not the frequency of the retrial of data read operation exceeds a predetermined value. When the frequency of the retrial of data read operation does not exceed a predetermined value, the program proceeds back to step 44 where microcontroller 14 determines whether or not an IDX pulse is detected. When the IDX pulse is detected, steps 46 through 54 are again executed. On the other hand, if the frequency of the retrial of data read operation exceed the predetermined value, the program proceeds to step 56 and microcontroller 14 reports the generation of error to the host computer. Thus, the wiggle noise elimination routine is concluded.

Meanwhile, a WG pulse has been enabled at the gap interval between sector 1 and sector 2 as shown in FIG. 4 in an embodiment according to the present invention, but the WG pulse may be enabled at any one of the gap intervals between sectors positioned on an identical track without any modifications, causing the arrangement state of the magnetic polarity of the head to be converted into a stable state. Accordingly, the scope of the present invention should not be determined by the particular embodiment as disclosed above, but is to be determined solely by the appended claims and its equivalents.

As described above, the present invention has an advantage that a wiggle noise is eliminated by executing the dummy write operation on any one of gap intervals between sectors on an identical track without seeking any auxiliary track and including a separate area, which causes the time required for track seek for the wiggle noise elimination to be reduced and utility of spare sectors to be increased, thereby improving the performance of the HDD.

While there have been illustrated and described what are considered to be preferred embodiments of the present invention, it will be understood by those skilled in the art that various changes and modifications and equivalents may be substituted for elements thereof without departing from the true scope of the present invention. Therefore, it is intended that the present invention not be limited to the particular embodiments disclosed as the best mode contemplated for carrying out the present invention, but that the present invention embraces all alternatives, modifications and variances falling within the scope of the appended claims.

What is claimed is:

1. A method of eliminating a wiggle noise generated by a data write current applied to a thin-film head during a data write operation in a disk drive storage apparatus having a storage medium on which data is recorded, said method comprising the step of:

controlling said head to perform a dummy write operation onto a gap between sector intervals in a corresponding track on the storage medium when a read error occurs during a data read operation; and retrying said data read operation, said data read operation being retried a predetermined number of times if the read error continues to occur during said data read operation.

2. The method according to claim 1, wherein said dummy write operation is executed in synchronism with a detection timing point of an index pulse from the storage medium.

3. A method of eliminating a wiggle noise generated in a magnetic head of a disk drive due to a domain pinning phenomenon occurring during a transition from a write operation to a read operation, said method comprising the steps of:

performing a track following operation;

detecting occurrence of a read error due to said wiggle noise occurring during a read operation for reading servo information for controlling a magnetic head during a write operation;

detecting when a microcontroller of said disk drive has generated an index pulse after detection of said read error; and executing a write operation while said head is positioned over a gap between adjacent sectors of a track being followed during said track following operation upon detection of said index pulse.

4. The method as set forth in claim 3, further comprising the steps of:

attempting to read the same servo information which was being read during said read operation;

determining whether another read error occurs while attempting to read said same servo information;

determining whether a predetermined number of sequential read errors have occurred while attempting to read said same servo information;

returning to said step of detecting when a microcontroller of said disk drive has generated an index pulse when it is determined that said predetermined number of sequential read errors has not occurred; and reporting said read error to a host computer to which said disk drive is connected when said predetermined number of sequential read errors has occurred.

5. The method as set forth in claim 4, further comprising a step of performing a track following subroutine when no read error occurs.

6. A method of eliminating a wiggle noise generated in a magnetic head of a disk drive due to a domain pinning phenomenon occurring during a transition from a write operation to a read operation, said method comprising the steps of:

performing a track following operation;

detecting occurrence of a read error due to said wiggle noise occurring during a read operation for reading servo information for controlling a magnetic head during a write operation; and executing a write operation while said head is positioned over a gap between adjacent sectors of a track being followed during said track following operation to eliminate said wiggle noise.

7. The method as set forth in claim 6, further comprising the steps of:

determining whether said wiggle noise was eliminated by said write operation by attempting to read the same servo information which was being read during said read operation;

determining whether a predetermined number of sequential read errors have occurred when it is determined that said wiggle noise was not eliminated; and reporting said read error to a host computer to which said disk drive is connected when it is determined that said predetermined number of sequential read errors has occurred.

8. The method as set forth in claim 7, further comprising a step of performing a track following subroutine when it is determined that said wiggle noise was eliminated.

9. The method as set forth in claim 6, further comprising a step of detecting when a microcontroller of said disk drive has generated an index pulse after detection of said read error for synchronizing said write operation in accordance with said index pulse.

10. The method as set forth in claim 9, further comprising the steps of:

determining whether said wiggle noise was eliminated by said write operation by attempting to read the same servo information which was being read during said read operation;

determining whether a predetermined number of sequential read errors have occurred when it is determined that said wiggle noise was not eliminated; and reporting said read error to a host computer to which said disk drive is connected when it is determined that said predetermined number of sequential read errors has occurred.

11. The method as set forth in claim 10, further comprising a step of returning to said step of detecting when a microcontroller of said disk drive has generated an index pulse, when it is determined that said predetermined number of sequential read errors has not occurred.

12. The method as set forth in claim 10, further comprising a step of performing a track following subrouting when it is determined that said wiggle noise was eliminated.

* * * * *